United States Patent
Link, II et al.

(10) Patent No.: US 7,116,975 B1
(45) Date of Patent: Oct. 3, 2006

(54) SYSTEMS AND METHODS FOR AUTOMATIC CALL FORWARDING IN A WIRELESS MOBILE STATION

(75) Inventors: Charles Martin Link, II, Atlanta, GA (US); Donald Michael Cardina, Lawrenceville, GA (US); Thomas Wayne Bonner, Smyrna, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 222 days.

(21) Appl. No.: 10/762,891

(22) Filed: Jan. 21, 2004

Related U.S. Application Data

(60) Provisional application No. 60/441,328, filed on Jan. 21, 2003, provisional application No. 60/501,534, filed on Sep. 8, 2003.

(51) Int. Cl.
*H04M 3/42* (2006.01)

(52) U.S. Cl. .............. 455/417; 455/415; 455/420; 455/462; 455/41.2; 379/211.01; 379/211.02

(58) Field of Classification Search .............. 455/417, 455/412, 415, 420, 462, 466, 41.2; 379/211.01, 379/211.02, 211.03, 211.04
See application file for complete search history.

(56) References Cited

U.S. PATENT DOCUMENTS

| | | | | |
|---|---|---|---|---|
| 5,197,092 A | * | 3/1993 | Bamburak | 379/211.05 |
| 5,428,663 A | * | 6/1995 | Grimes et al. | 340/7.21 |
| 5,509,052 A | * | 4/1996 | Chia et al. | 455/465 |
| 5,515,420 A | * | 5/1996 | Urasaka et al. | 455/564 |
| 5,903,833 A | * | 5/1999 | Jonsson et al. | 455/417 |
| 5,933,774 A | * | 8/1999 | Bertocci | 455/417 |
| 5,966,653 A | * | 10/1999 | Joensuu et al. | 455/445 |
| 6,049,719 A | * | 4/2000 | Schroter | 455/462 |
| 6,151,500 A | | 11/2000 | Cardina et al. | |
| 6,233,448 B1 | * | 5/2001 | Alperovich et al. | 455/417 |
| 6,253,088 B1 | * | 6/2001 | Wenk et al. | 455/462 |
| 6,275,577 B1 | * | 8/2001 | Jackson | 379/211.01 |
| 6,408,177 B1 | * | 6/2002 | Parikh et al. | 455/414.4 |
| 2002/0164979 A1 | * | 11/2002 | Mooney et al. | 455/417 |
| 2003/0040308 A1 | * | 2/2003 | Gieseke | 455/426 |
| 2003/0181202 A1 | | 9/2003 | Link et al. | |

* cited by examiner

*Primary Examiner*—Steve M. D'Agosta
(74) *Attorney, Agent, or Firm*—Parks Knowlton LLC; J. Perry Herndon, Esq.; Coulter C. Henry

(57) ABSTRACT

Apparatus, method and system for notifying a communications-switching center that subsequent communications directed to a wireless number associated with the wireless unit are to be routed to a destination number associated with the wireless unit. In response to a triggering event by the wireless unit through the base unit, the base unit causes the wireless unit to transmit an SMS message to the communications-switching center. The SMS message includes a notification that subsequent communications directed to the wireless number associated with the wireless unit are to be routed to the destination number associated with the wireless unit.

7 Claims, 10 Drawing Sheets

TDMA- SMS Message initiating call forward request

GSM- SMS Message initiating call forward request

SYSTEMS AND METHODS FOR AUTOMATIC CALL FORWARDING IN A WIRELESS MOBILE STATION

CROSS REFERENCE TO RELATED PATENT APPLICATIONS

This patent claims benefit of U.S. Provisional Application Nos. 60/441,328 and 60/501,534, filed Jan. 21, 2003 and Sep. 8, 2003, entitled "Systems and Methods for Automatic Call Forwarding" and "Call Forward Instrument", respectively. These items are incorporated herein by reference in their entirety.

BACKGROUND OF THE INVENTION

1. Field of Invention

This invention generally relates to telecommunication service and, more particularly, to a device that automatically forwards telephone service upon detecting a triggering event, such as receipt of a wireless telephone within a socket defined by the device.

2. Description of Related Art

In recent years, the vast majority of the industrialized world has become accessible via the public switched telephone network (PSTN). Most commonly, this accessibility has been implemented through conventional telephone systems. A conventional telephone system may be considered to be and is hereinafter included in the general category of wire-line systems, i.e., telecommunications systems that transmit communications over lines such as copper, cable, or fiber optic lines. Thus, a unit that operates in a wire-line system may be referred to as a wire-line unit. For example, corded and cordless telephones are common examples of wire-line units.

The popularity and widespread acceptance of wireless communication systems have brought about the development of systems that work as an adjunct to wireless communication systems and with the PSTN. An example of an adjunct to wireless communication systems is the fixed wireless (FWL) system. An FWL system allows a user to effectively convert certain conventional wire-line telephones into extensions of the user's wireless telephone or unit. In particular, an FWL system usually includes a cell phone physically connected to one or more conventional telephones within a discrete location, such as a home or office. The FWL system allows the user to make use of the wireless communication system through the connected conventional telephones. These extensions to the cell phone may provide the user with certain advantages. Yet, these FWL systems do not provide the user with access to the PSTN independently of the wireless communication system. Such lack of direct access to the PSTN could be critical in the event that one of the wireless communication links, from and including the cell phone to the wireless communication system, is not functioning properly.

Another example of an adjunct to wireless communication systems is a type of system referred to herein as "base station" technology, but also commonly known as "cellular cordless" technology. Base station technology allows a user to make use of certain aspects of conventional telephone systems and of wireless communication systems. To utilize this base station technology, a user who has access to the PSTN and who also has access to a wireless communication system must purchase both a specially equipped base station and a specially equipped cell phone, e.g., such equipment is manufactured by Motorola Inc., 600 North U.S. Hwy 45, Libertyville, Ill. 60048 and is available as a Personal Phone Series (PPS) system. The base station is located typically at the user's base of operation, be it a residence, office or the like. The base station is connected to the PSTN and includes a mechanism for detecting the proximal presence of the user's cell phone when that cell phone is within a certain limited geographical distance of the base station. In essence, the base station functions as a cell site which provides a continuous "control channel" in a manner similar to a conventional cell site. The base station is different from the conventional cell site in that it utilizes a non-standard control channel that changes based on internal interference avoidance algorithms.

Normal operation of the specially equipped cell phone includes a periodic scan of the designated control channel to determine whether the cell phone is within range of the base station. If so, the cell phone and base station "handshake" in a manner well known in the telecommunications field. The result of the handshake is registration of the cell phone with the base station, which registration triggers an operational switch to the cell phone operating with the base station from the cell phone operating with the cellular network. The wireless communication system is then notified of the registration. Typically, the base station then functions as a wire-line unit and is assigned a wire-line number. Accordingly, after the wireless communication system is notified of the registration of the cell phone with the base station, the wireless communication system does not accept or continue handling the communication directed to the number associated with the cell phone in the conventional manner. Instead, the wireless communication system effectively relinquishes the communication to the PSTN. Thereafter, the communication is routed in a conventional manner through the PSTN to the base station as if it were a wire-line call.

In response to receiving the communication through the PSTN, the base station transmits the communication to the cell phone in the same manner as communications would be transmitted to a cordless telephone in a wire-line system. Effectively, the cell phone functions as a cordless telephone. By this relay of the communication, the wireless communication system is not involved in the communication. Thus, expenses associated with cellular services and usage fees are obviated with respect to this communication. In other words, even though this communication was initially directed to a number associated with a cell phone, the communication is ultimately connected as a conventional telephone call or wire-line call. Thus, the user is not charged cellular service charges for the communication.

In summary, base station technology allows increased flexibility for a user because the user may use a cell phone in a manner that does not incur the significantly higher usage fees typically accompanying cell phone use. The benefits of base station technology, though, are predicated upon several factors. First, the user must purchase a specially equipped cell phone and also purchase an accompanying specially equipped base station. Second, the cell phone must be within proximal range of its base station. Even after these criteria are met, a user must still provide two telephone exchange numbers—one for the cellular service and one for the landline service. Finally, an individual who desires to implement base station technology will, after purchasing the specialized base station and cell phone, likely be left with a conventional cordless phone which is unusable in conjunction with the base station technology.

Applicant is aware of a cellular telephone call-forwarding system using an adjunct device. That system provides a mechanism for routing calls intended for a wireless unit to an alternate destination number, specifically a wire-line number. In that system, the wireless unit is placed in a cradle-like portion of an adjunct device to automatically initiate a call forward request in response to a triggering event. Subsequently, all calls directed to the wireless unit will be routed to a predetermined destination number.

However, the present invention is an improvement on such prior art systems. Specifically, the prior art systems require advanced processors located in the adjunct device to perform the call forward functions. For example, U.S. Pat. No. 6,151,500 (hereinafter the '500 patent), assigned to one of the parent corporations of the assignee of the present invention, uses a converter device to detect a threshold amount of current drawn from the battery source of the wireless unit when placed in the cradle as a triggering event to initiate a call forward request. In response to the triggering event, the call forward device itself transmits a message to the wireless communications network thereby providing instructions to direct subsequent calls originally destined to a wireless number to a different predetermined location. Since the call forward adjunct device transmits the call forward message, the processing device in the '500 patent teaches methods to construct the message and to detect the current flow that initiates the triggering event. Additionally, the '500 patent requires that the call forward device have a communications channel to the wireless communications network.

U.S. Published Patent Application No. 2003/0181202 A1 (hereinafter the '202 app.) (Also assigned to the Assignee of the '500 patent) teaches additional methods for causing triggering events and providing call forward instructions to the wireless communications system. According to one embodiment of the '202 app., similar to the '500 patent, the call forwarding adjunct device constructs an SMS message and transmits the message to the wireless communications system. In that embodiment, the call forward adjunct device contains a memory that stores the operating algorithm and a destination number.

U.S. Pat. No. 5,933,774, (the '774 patent) similar to the '500 patent, teaches of a call forward adjunct device that initiates a modem connection to the wireless communications system to communicate the call forward request. This method requires both a connection to the wireless communications system as well as a dedicated PSTN line.

Each of these items is hereby incorporated by reference in their entirety.

SUMMARY OF THE INVENTION

Accordingly, there is a need to address the certain short comings of the prior art devices and to provide a user, who has access to the PSTN and also subscribes to a wireless communication service, a method to receive a wireless communication initiated through a wireless network through a wire-line system in a reliable, simple and more cost-efficient manner than currently available. Furthermore, there is a need to provide receipt of wireless communications without requiring a user to provide different telephone exchange numbers to individuals who may be interested in calling the user at a "home" location. Finally, there is a need to provide a wireless communications service that will incorporate existing personal communication hardware, such as conventional cordless phones, rather than replace them.

The present invention allows a user who has access to both a wire-line system and a wireless communication system to receive a wireless communication at a home or other predetermined fixed location similar to a typical wire-line service. Routing the wireless communications is not limited to predetermined fixed locations and may also include routing to other remote and/or wireless devices. The present invention provides methods, systems and apparatus for registering or otherwise making use of a wireless unit that operatively forms an association with a base unit to receive a communication intended for a wireless device via a wire-line phone. By this registration or use, subsequent communications directed to a wireless number associated with the wireless unit are routed so that the communication may be received at the predetermined fixed location or other designated location similar to a typical wire-line service. Advantageously, the present invention provides telecommunications services conveniently and inexpensively. More particularly, the present invention provides a user who has access to the PSTN and also subscribes to a wireless communication service with a method to receive a wireless communication through a wire-line system in a reliable and more cost-efficient manner than currently available.

The present invention provides multiple benefits to a user. First, an individual who subscribes to both wireless and wire-line services receives a high quality communication with the added financial benefit of receiving a wireless communication via a wire-line communication device, thus the user's allotted wireless minutes may not be used while the wireless unit is connected to the base unit. Additionally, a call may be received by a user on his wire-line phone from a caller who may know only the user's wireless number and may be unaware of the user's wire-line destination number. This allows the user to maintain a degree of anonymity where he may use the wireless unit for employment but chooses not to give a caller his/her home phone number. Moreover, the present invention provides such a capability without requiring purchase of a specially equipped cell phone. Furthermore, the present invention is configured such that it can readily incorporate existing personal communication hardware, such as conventional corded or cordless phones.

As noted above, the present invention provides exemplary methods, systems and apparatus for making use of a wireless unit so that, in response to a triggering event, subsequent communications directed to a wireless number associated with the wireless unit may be routed to any destination numbers associated with designated wire-line units or other wireless devices, wherein the destination numbers are parsed from the phonebook memory of the wireless unit, for example, using a text scanning method. An exemplary method may include steps for notifying a communications-switching center so that subsequent communications directed to a wireless number are routed to a destination number associated with a wire-line unit. These steps may include causing a detection device to recognize the receipt of a wireless unit into a base unit, or to recognize the receipt of the wireless unit within a proximal distance thereto as detected through a Bluetooth beacon device. In response to the detection, the base unit device may instruct the wireless unit to transmit an SMS message to the communications-switching center of an attached wireless network. The SMS message includes a notification that subsequent communications directed to the wireless number may be routed to the destination number associated with the wire-line unit The present invention also provides an exemplary system for instructing a communications-switching center to direct a wireless communication to a destination number associated with a wire-line unit. This system includes a base unit functionally connected to the communications-switching center. The base unit also may be functionally connected to a current source. The system also includes at least one wireless unit having a wireless number and being operative to form an association with the base unit. The association between the base unit and the wireless unit may be a connection maintained substantially continuously over a predetermined period of time. The association may be a physical connection or a contact-less "handshake"-type connection between the wireless unit and the base unit. In addition, the base unit is further operative to respond to the association with the wireless unit by causing the wireless unit to transmit an SMS message to the communications-switching center. The SMS message includes a notification that subsequent communications directed to the wireless number are to be routed to a destination number associated with another communication device, such as a wire-line unit, that is parsed from the wireless unit's phonebook memory.

In addition, the present invention includes an exemplary apparatus for registering a wireless unit with a communications-switching center so that, responsive to a triggering event, subsequent communications directed to a wireless number associated with the wireless unit are routed to a destination number associated with another communication device, such as a wire-line unit. This apparatus includes a detector, a power supply and a transmitter functionally connected to the detector. The detector detects the occurrence of a triggering event. In response to the detection of the triggering event, the detector provides a signal to the transmitter that indicates the occurrence of the triggering event. In response to the signal from the detector, the base unit may instruct the wireless unit to transmit an SMS message via the transmitter to the communications-switching center. This SMS message includes a notification that subsequent communications directed to the wireless number associated with the wireless unit are to be routed to the destination number associated with the wire-line unit.

This exemplary apparatus may further provide that the detector is further operative to detect a disassociation of the triggering event. The disassociation of the triggering event may include the actuation of a switch or an indication that a proximal distance between the wireless unit and the base unit has not been maintained. In response to the detection of the disassociation, the detector provides a disassociation signal to the transmitter. The transmitter responds to the disassociation signal by transmitting a disassociation message to the communications-switching center. The disassociation message includes an instruction to cancel the call forward instruction and to route subsequent communications directed to the wireless number to the wireless unit.

Further, the present invention provides another exemplary apparatus for notifying a communications-switching center so that a subsequent communication directed to a wireless number associated with a wireless unit is routed to a destination number associated with a wire-line unit.

Accordingly, it is an object of the present invention is to route incoming wireless communications to conventional wire-line communications devices.

It is a further object of the invention to provide a method and apparatus for converting incoming wireless communications to wire-line communications without requiring the purchase of a specialized telephone or base unit.

Still another object of the present invention is to readily incorporate existing personal communication hardware, such as conventional cordless phones, into the operation of the present invention.

Yet another object of the invention is to provide a method and apparatus that routes incoming wireless communications to conventional wire-line communications devices upon the occurrence of a triggering event, such as, for example, the actuation of a switch on the base unit.

It is also an object of the invention to allow cellular and wire-line service providers a method to account for and control use of such a method and apparatus, thereby generating revenue from such use.

The objects of the invention set forth herein and the preferred embodiments thereof overcome the drawbacks set forth above and will become apparent from the detailed description of the preferred embodiments to follow.

BRIEF DESCRIPTION OF THE DRAWINGS

Many aspects of this invention can be better understood with reference to the following drawings. The components in the drawings are not necessarily to scale, emphasis instead is placed upon clearly illustrating the principles of the present invention. Moreover, in the drawings, like reference numerals designate corresponding parts throughout the several views.

DETAILED DESCRIPTION OF EXEMPLARY EMBODIMENTS

Figure 1:
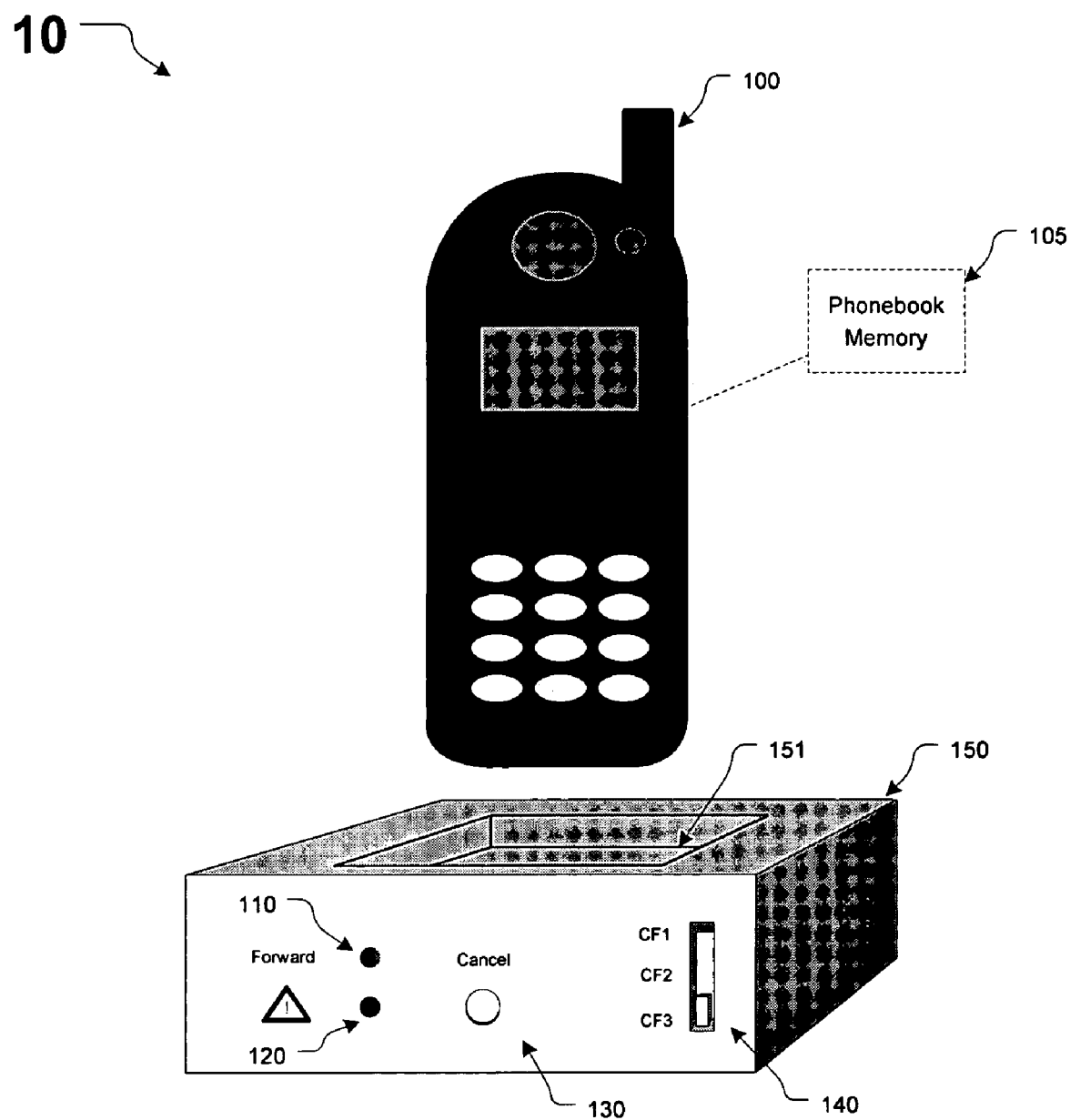
FIG. 1 illustrates a first exemplary embodiment of a call forward device according to this invention.

The present invention provides methods, systems and apparatus for routing a communication directed to a wireless number (dialed number or DN) of a wireless communication system to a destination number associated with a wire-line unit. Such routing is accomplished in accordance with the disclosure provided herein, wherein the wireless unit is communicatively coupled with a base unit. Operationally, (1) the wireless unit may be physically connected to a base unit; (2) a switch on a base unit may be activated or (3) a beacon device may detect the presence of the wireless unit. In response to a triggering event, the base unit causes the transmissions of an SMS message from the wireless unit to a communications-switching center.

To minimize cost to the user, the SMS message may be implemented, for example, as a nonbillable SMS message. The SMS message provides call routing information in response to a triggering event for subsequent communications directed to the wireless number associated with the wireless unit coupled to the base unit. In particular, a subsequent communication directed to the wireless number associated with the wireless unit is routed so that the communication may be received at a predetermined location similar to a typical wire-line service. The present invention "converts" a communication directed to a wireless number associated with a wireless unit into a communication that is directed through the wire-line system to a destination number associated with a wire-line unit.

In the embodiments throughout this specification, SMS messaging is employed as the preferred messaging format used in this invention. However, it should be understood that any other type of messaging format now known or later developed may be used without departing from the scope of the invention. For example, in the GSM environment, the Unstructured Supplementary Service Data (USSD) messaging format or the Shared Secret Data (SSD) format may be used.

The present invention includes a base unit that detects a triggering event. The triggering event may be implemented as will be described in detail hereinafter. A first embodiment of the base unit is described in detail below in connection with FIGS. 1 & 2. Additionally, a second embodiment of the base unit is described with respect to FIG. 3.

As noted above, a wireless device is used as a communication tool in the wireless system. Such wireless units may include cell phones, or the like. For exemplary purposes, a cell phone is provided according to a description of the present invention. However, the present invention may also be used with a variety of types or brands of wireless devices. Accordingly, the term "wireless device" and "wireless unit" are used interchangeably herein and such use is not intended to be limited to a cell phone. The present invention also may be implemented with other appropriate configurations including, but not limited to, other types of wireless units such as personal communication service (PCS) units, personal digital assistants (PDAs), or the like.

To differentiate herein a number associated with a wire-line unit from a wireless number associated with a wireless unit, the term "destination number" is used with respect to the number associated with the wire-line unit and the term "dialed number" is used to designate the number the caller dials and is, in the present invention, associated with the wireless unit. However, because the principles of the current invention may also be used to forward a call to a different wireless number, the term "destination number" will designate any number to which the dialed number will be forwarded and also include such a wireless number to which the call will be forwarded.

The term "wireless network" is used to designate a cellular communications system. It is to be understood that a wireless communication system includes radiotelephony systems such as PCS systems, global standard for mobile communications (GSM) systems, TDMA, CDMA, and other such systems. Appropriately configured, the present invention may be used in all such systems.

The examples used in this specification illustrate initiating call forwarding scenarios. It should be understood that the same techniques may be employed to implement call forward cancel requests to the wireless network, according to this invention.

Referring now to the drawings, in which like numerals indicate like elements throughout the several views, FIG. 1 illustrates an exemplary embodiment of the call forwarding device 10. The call forwarding device 10 may be a stand alone, powered device.

The call forward device 10 provides call forward services through a base unit 150 requesting that the wireless device 100 send SMS messages, specifically, call forward requests. This conversion is performed by interfacing with SS7 network elements and translating call forwarding requests through a call forward server 350, which connects to the STP 380.

In operation, when the wireless unit 100 is coupled to a base unit 150, a triggering event occurs that causes a communication, which was intended to be routed to the wireless unit 100, to be routed to an alternate destination, such as a wire-line unit. For example, when the wireless unit 100 is located in the cradle 151, the call forwarding device 10 automatically forwards telephone service destined for the wireless unit 100 to a call forwarding number associated with the position of switch 140. Switch 140 preferably has multiple settings designating memory locations from which the destination number is to be retrieved, which may, for example, be designated as CF1, CF2, CF3, etc. That is, the call forwarding device 10 detects the presence of the wireless unit 100 in the cradle 151 as the triggering event that causes the call forwarding device to automatically forward telephone service for the wireless unit 100. To do so, the destination number is determined when the base unit 150 reads a call forwarding number stored in the phonebook memory 105 of the wireless unit 100 and instructs the wireless unit 100 to construct a Short Messaging System (SMS) message including the destination number, the wireless unit serial number, and telephone service redirection instructions. Since most handsets store entries by phonebook entry name (not referencing a specific memory location), it is preferable that reading or text-scanning the user phonebook entries for the entry corresponding to a designated code name provides this function, for example, stored in the memory 105 may be numerous call forwarding numbers designated as "CF1", "CF2", "CF3", each designation indicates a different call forward number and serves as a pointer when the phonebook memory 105 is scanned. The call forwarding device 10 then causes the wireless unit 100 to transmit an SMS message to a wireless network.

Additionally, a default destination number, for example designated as "DF" in memory 105, may be stored to serve as a "back-up" to the "preferred" call forward numbers ("CF1", "CF2", "CF3", etc.) should an error be returned from the call forward and cancel network. In operation, upon failure of an initial call forward request, a second SMS message could be automatically sent to the call forward network indicating the default destination number.

As shown in FIG. 1, the switch 140 preferably has a switch position associated with each of the call forward entries. As a call forwarding request is initiated by the triggering event, the base unit 150 initiates a read request in the memory 105 such that the destination number stored in the memory 105 associated with the position of switch 140 is read and sent as the requested destination number. It should be appreciated that although the switch 140 illustrates only three available positions, any multi-position switch may be used in its place. Accordingly, any number of call forwarding numbers may be stored in the memory 105 and used according to this invention.

FIG. 1 also shows indicators, such as LED's 110 and 120. A call-forward cancel button 130 is also provided to manually cancel the call forward feature. However, it should be understood that the call forward cancel process may also be triggered by removing the wireless unit from the cradle 151. Additionally, it should be understood that a manual call forward button (not shown in Figs.) may be also provided to manually initiate a triggering event to initiate the call forward request. LED 110 may indicate a successful call-forward setup. The successful call-forward setup may be verified upon receipt of a "status-ok" indication from the wireless network. The LED 120 may be provided to indicate an error with the setup of the call-forward request. This error indication may also be verified and generated by the wireless network.

Figure 2:
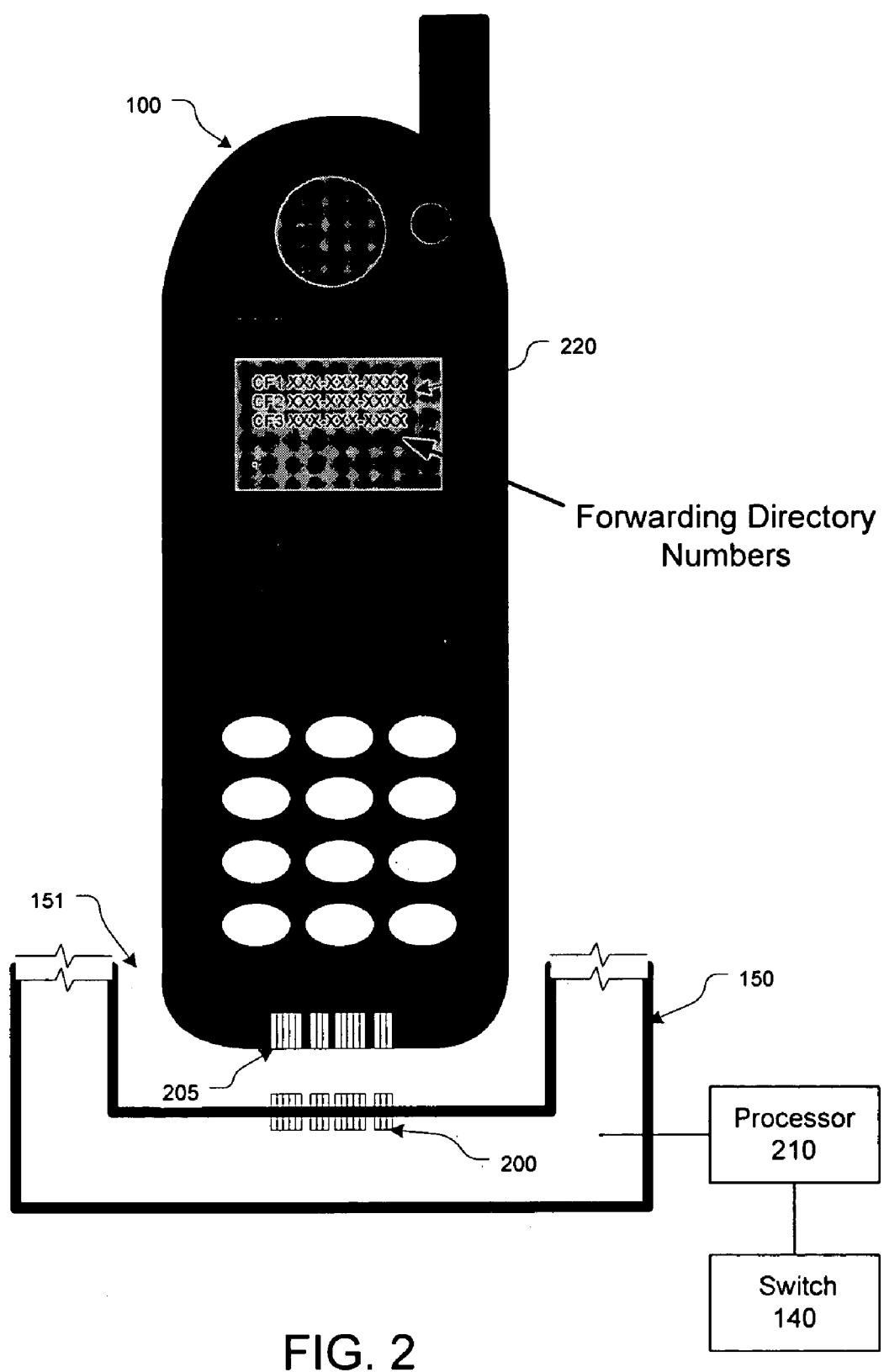
FIG. 2 is an exemplary illustration of the functional connections of the call forward device of FIG. 1.

FIG. 2 illustrates the functional connection between the cradle 151 and the wireless unit 100. Specifically, the wireless unit 100 includes a contact 205 that becomes functionally and physically connected with a contact 200 on the base unit 150 when the wireless unit 100 is placed in the cradle 151. The contacts 200 and 205 may be composed of touch pins and/or any other type of physical connection now known or later developed in accordance with systems and methods of this invention, including but not limited to a bidirectional cable. The detection of the wireless unit 100 as it is placed in the cradle 151 can be any now known or later developed method of detection. For example, the detection may be implemented in the form of an actuator switch or a current drop across the touch pin contacts 200 and 205. The detection method employed will be used to generate a triggering event to cause the base unit 150 to read the call-forward numbers 220 from the memory of the wireless unit 100.

According to this exemplary embodiment, upon contact, the base unit 150 recognizes the position of switch 140, and initiates instructions to the wireless unit to search for and read the appropriate call forwarding number 220, as indicated by the position of switch 140, from the phonebook memory of the wireless unit 100. The base unit 150 then instructs the wireless unit to construct an SMS message, which may include the wireless unit serial number, the destination number, and telephone service redirection instructions, if any. The base unit 150 then causes the wireless unit 100 to transmit the SMS message to the SMSC of the wireless network. In the alternative, it should be understood that the SMS message could be constructed by the base unit 150 and transferred via the wireless unit 100 to the SMSC. Accordingly, those skilled in the art would recognize that the functions performed by the base unit 150 and the wireless unit 100 may be interchangeable. Also, it should be understood that the instructions used by the base unit 150 may be any type of instruction set recognizable by the wireless unit 100, such as, the AT command set or any wireless unit manufacturer specific instruction codes.

To provide the functionality for forwarding the SMS message, the contacts 200 and 205 may include at least one universal bi-directional data contact that may be used to upload and/or download information. For example, the contacts 200 and 205 may include two contacts for charging the battery within the wireless unit 100, and a third bi-directional data contact. This data contact uploads and downloads data, such as the forwarding instructions between the base unit 150 and the wireless unit 100.

The contact 200 functionally connects wireless unit 100 to a processor 210 located within the base unit 150. It should be appreciated that although the exemplary embodiments described herein depict the processor 210 being in the base unit 150, it is known that the processor 210 could be located in the wireless unit 100 without departing from the scope of the invention. The manner in which the processor 210 operates is described in more detail with respect to FIG. 4.

Those skilled in the art will appreciate that, in addition to the functions described above, the base unit 150 may perform any or all of the functions typically ascribed to such cradle devices, such as battery charging. In certain embodiments, the base unit 150 is adaptable to automatically power up the wireless unit 100 when it is placed in the base unit 150 so that the wireless unit 100 is available for a call forwarding mode of operation. In certain other embodiments, the base unit 150 may detect whether a wireless unit 100 is not properly seated so as to be connected to the contacts 200. Accordingly, an audible or visible alert may emanate from the base unit 150 to notify the user that a proper connection cannot be established. In certain embodiments, the base unit 150 may detect the existence of a viable connection between the wireless unit 100 and the power supply provided by the base unit 150. If the wireless unit 100 is not receiving power, then and audible alert may emanate from the base unit 150.

In a second exemplary embodiment of this invention, a Bluetooth trigger and detection method is employed to cause the call forward device 10 to detect the presence of the Bluetooth enabled wireless unit 101, initiate a triggering event, and cause the Bluetooth enabled wireless unit 101 to create and transmit an SMS message to the wireless network. For purposes of this exemplary embodiment, Bluetooth is chosen as the preferred RF technology. However, any other RF technology may be employed without departing from the scope of the invention.

Similar to the base unit described with respect to the first embodiment of this invention, the Bluetooth enabled base unit 155 may include a multi-position switch that preferably has a switch position associated with a plurality of destination numbers, such that each position of the switch corresponds to each of the call forward entries. Wherein, as a call forwarding request is initiated by the triggering event, the Bluetooth enabled base unit 155 initiates a read request in the memory of the Bluetooth enabled wireless unit 101 in a manner previously described using memory designations such as CF1, CF2, CF3, etc. Also indicators, such as LED's may be used to provide call forward status alerts. A call-forward cancel button may also be provided to cancel the call forward feature. The indicators and cancel button may be operable as described herein with respect to other embodiments of this invention.

Figure 3:
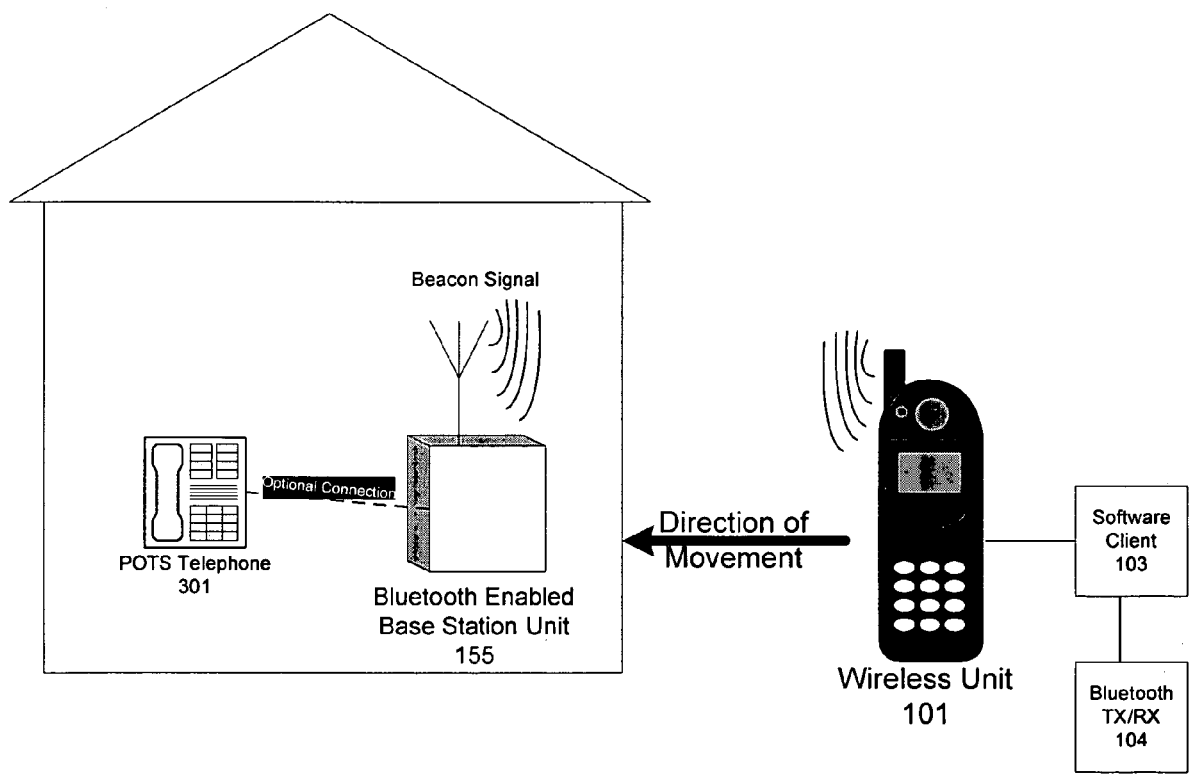
FIG. 3 illustrates a second exemplary embodiment of the call forward device according to this invention.

FIG. 3 illustrates the functional connection between the Bluetooth enabled base unit 155 and the Bluetooth enabled wireless unit 101. Specifically, the Bluetooth enabled wireless unit 101 includes a Bluetooth software client 103 and a Bluetooth transmitter/receiver (TX/RX) 104 that becomes functionally connected with a Bluetooth beacon signal emitting from the Bluetooth enabled base unit 155 when the Bluetooth enabled wireless unit 101 comes within a predetermined proximity to the Bluetooth enabled base unit 155. Which may, for example, be about 10 feet.

The Bluetooth software client 103, beacon signal and TX/RX 104 allow the Bluetooth enabled base unit 155 to communicate with the Bluetooth enabled wireless unit 101 using a Bluetooth RF link. A one-time Bluetooth pairing process as is known in the art will be completed prior to performing any one of the operations described below. Various aspects and/or features of this invention include using the Bluetooth enabled base unit 155 (within an enclosed space, for example, within a subscriber's home location) to: (1) send commands to the Bluetooth enabled wireless unit 101; (2) read information stored in memory of the Bluetooth enabled wireless unit 101, (3) receive status and fault indications from the wireless network; and (4) cause the Bluetooth enabled wireless unit 101 to send call forward instructions over the Bluetooth and GSM radio links.

Similar to the previous embodiments, a triggering event is generated when the Bluetooth enabled wireless unit 101 is detected by the Bluetooth beacon of the Bluetooth enabled base unit 155. In response to the triggering event, the Bluetooth enabled base unit 155 to read the call-forward numbers from the memory of the Bluetooth enabled wireless unit 101. The software client 103 interacts with the Bluetooth enabled base unit 155 and the Bluetooth enabled wireless unit 101 to send and receive call forward information to and from the Bluetooth enabled base unit 155.

In operation, the Bluetooth enabled base unit 155 and the Bluetooth enabled wireless unit 101 can be configured to operate via Bluetooth wireless technology within a personal-area-network, or piconet. The piconet is composed of a master and at least one active slave device. Once the piconet is established, the participating devices randomly hop frequencies in unison so that they stay in touch with one another and avoid other piconets that may be operating in the same room, such as a piconet formed between a television and its remote control. The device designated as the master makes the determination of the channel (frequency-hopping sequence) and phase (timing offset, i.e., when to transmit) that shall be used by all devices on the piconet. The master and slave relationship may be implemented and/or exchanged between the Bluetooth enabled wireless unit 101 and the Bluetooth enabled base unit 155. In accordance with standard Bluetooth link control manager protocol, in order to detect the presence of the Bluetooth enabled wireless unit 101, the base unit 155 broadcasts a beacon signal. In a sniff mode, the Bluetooth enabled wireless unit 101 detects the broadcast beacon signal and verifies whether the broadcast beacon signal is valid. That is, the Bluetooth enabled wireless unit 101 determines whether an address associated with the broadcast beacon signal transmitted from the Bluetooth enabled base unit 155 matches, or is paired, with an address associated with the Bluetooth enabled wireless unit 101. The respective devices may continuously perform the broadcast and sniffing operation.

A "paired link" connection is automatically initiated between the Bluetooth enabled wireless unit 101 and the Bluetooth enabled base, unit 155 when the presence of the Bluetooth enabled wireless unit 101 is detected by the Bluetooth enabled base unit 155. When the address from each of the devices is authenticated (i.e., a paired link is formed) attachment between the two devices occurs. That is, a personal-area-network, or piconet is created. Thereafter, the Bluetooth enabled base unit 155 may evaluate and recognize the Bluetooth enabled wireless unit 101 as a valid client and may communicate via Bluetooth wireless technology with the Bluetooth enabled wireless unit 101. Bluetooth communication between the Bluetooth enabled wireless unit 101 and the Bluetooth enabled base unit 155 can be used with any now known, or later developed, power rating class associated with various Bluetooth transmission ranges in accordance with systems and methods of this invention.

Once the Bluetooth enabled wireless unit 101 is communicatively coupled to the Bluetooth enabled base unit 155 in accordance with the foregoing description, the subscriber may be prompted to select from a variety of menu options, such as: confirm attachment to beacon; activate call forward; disable call forward; and/or any other option now known or later developed in combination with call forward instructions. Access to perform each function, such as attachment and canceling may be performed in a variety of other ways that are commonly known or later developed, such as by entering and transmitting a security code to the Bluetooth enabled base unit 155.

The Bluetooth enabled base unit 155 may then return an indication ("status ok") to the Bluetooth enabled wireless unit 101 that the call forward request has been executed and completed by the wireless network.

According to this embodiment of the invention, it is also possible to send the call forward instructions from the POTS telephone 301, across the PSTN connection. Such actions could be performed using the triggering events described herein and conventional methods for initiating call forwarding in a POTS system. For example, the Bluetooth enabled base unit 155 may also be communicatively connected to the POTS telephone 301 in a conventional manner. In operation, the Bluetooth enabled base unit 155 could issue call forward instructions to the POTS telephone 301. In response to the call forward instructions, the POTS telephone 301 may issue call forward AT commands to a PSTN.

Currently, there is not a uniform mechanism in place to perform a call forwarding function from TDMA to GSM and vice versa. Further there is not a uniform mechanism in place to perform call forwarding in TDMA. Thus an aspect of this invention is to bridge this gap by providing a mechanism that performs a call forwarding function when used in a GAIT device that works in both the GSM and TDMA environments. GAIT handsets add an additional layer of complication because the GAIT handsets must operate in both GSM and TDMA markets and any external instrument, such as the call forward server 350 in FIG. 4, would have to know the serving system type before it can manipulate the call forwarding commands.

Acknowledging that some TDMA wireless units do not contain a mechanism for external SMS generation, a separate embodiment may be used to initiate a handset dialed call that contains the digit sequence for call forwarding activation. Typically this activation sequence is prefaced with a "*". Since various serving systems throughout a carrier's network use different activation and deactivation sequences, it is preferable that the wireless units 100 and 101 be able to store the complete forwarding string including the destination number. This means that if a serving system requires, for example, "*72 4045551212" to activate call forwarding; the memory 105 preferably should store the entire string. Further, in such cases, additional memory locations may be used to store the deactivation string. This could be implemented by the memory tag "UFCF1" (unforward call forward) or similar. Alternatively, this could be done by utilizing an additional named position for deactivation, for example, memory location "92".

Many TDMA wireless units have "AT" command sets as is known by those skilled in the art. The AT command set contains command extensions to support the above functions. If the TDMA wireless unit supports the European Telecommunications Standards Institute (ETSI) standard GSM functions completely, the wireless unit 100 can be used with the call forwarding device 10 in this manner.

Figure 4:
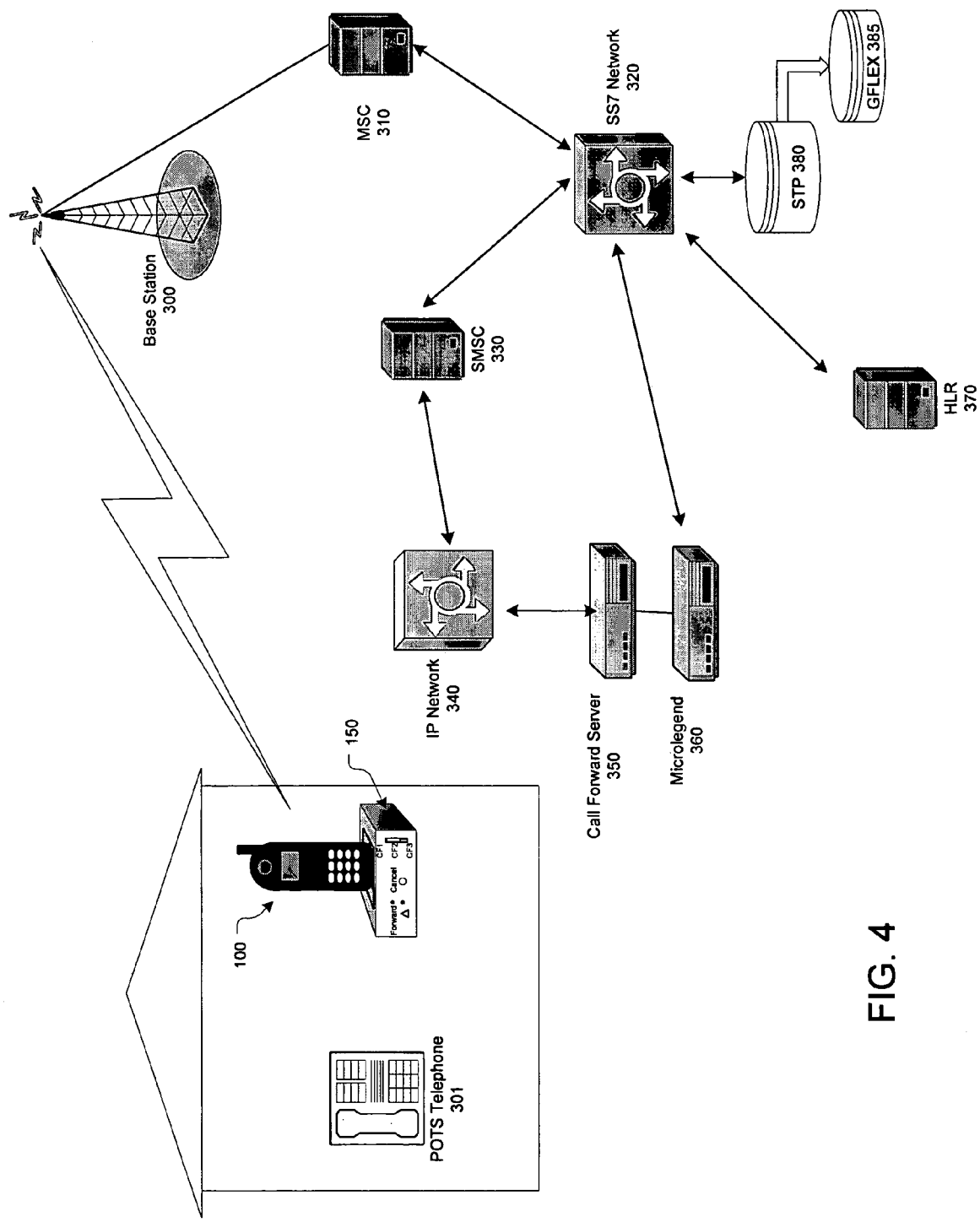
FIG. 4 illustrates an exemplary call forward network according to this invention.

Referring now to FIG. 4, once the wireless unit 100 has been detected by the base unit 150, the SMS message containing general header information, the serial number (ESN or IMSI) of the wireless unit 100, and the destination number is sent over the overhead control channel to the SMSC in accordance with known protocols. The header information contained in the SMS message serves as an address to the originating wireless unit. The SMSC 330 recognizes that the destination number contained in the SMS message belongs to an external application by certain information contained in the header and subsequently routes the SMS message to the call forward server 350 via the IP network 340. In other words, the SMSC 330 recognizes that the SMS message contains a destination number and call forward instructions based on call forward commands contained in the SMS message.

The call forward server 350 then decodes the SMS message and generates the appropriate action, for example, the call forward server 350 may generate a call forward feature request. The generation of the call forward feature request is discussed in further detail below. The call forward feature request is then forwarded by the call forward server 350 to the SS7 network 320, via the Microlegend 360. The Microlegend 360 provides protocol conversions between the TCP/IP based network elements and the SS7 network 320. The SS7 network 320 then forwards the call forward feature request to the STP 380. Subsequently based on the appropriate confirmation of the HLR 370 serving the dialed number, the STP 380 generates and forwards a call forward feature directive to the serving HLR 370.

It should be appreciated that the HLR 370 represents any HLR serving a dialed number subscribed to the call forward network. Additionally, it should be appreciated that since TDMA wireless units are identified by an Electronic Serial Number (ESN) and GSM wireless units are identified by an International Mobile Subscriber Identifier (IMSI), the format of the SMS messages used to activate and deactivate call forwarding for TDMA and GSM wireless units differ slightly. The ESN and IMSI are typically required to generate a call forward request, whether on the TDMA or GSM network. Finally, it should be appreciated that in the TDMA network, a SMS Request is formatted as an SMS message (i.e., an SMS Request). In the GSM network, the feature request is formatted as a Send Routing Information for Short Messages (SRIS).

According to this invention, the SMS message generated by wireless unit 100 is unique to the operating system (i.e. GSM, TDMA or CDMA) of that wireless unit. For example, the wireless unit 100 may be known to operate on the GSM network if a message header associated with the SMS message is formatted such that the originating mobile number has a "1" before the originating number. However, if the "1" is not present, the wireless unit is known to be from the TDMA network. The header information forwarded along with the SMS message serves as an origination address of the wireless unit 100.

Once the operating system of the wireless unit 100 has been identified by the contents of the SMS message (i.e. if the originating number has a "1" before it), the feature directive request is sent to the STP 380. As known in the art, the STP 380 contains a listing of the dialed numbers served by each of the operating systems, GSM, TDMA, or the like. Also contained in the STP 380 is a point code indicating the appropriate HLR 370 serving the dialed number. The STP 380 may be coupled with a GFLEX 385, which serves as an extender to the quantity of numbers stored in the STP 380.

In operation of the call forwarding device and not intending to limit the invention thereby, there are set forth below examples of six call forwarding scenarios wherein the device, according to this invention, may be used.

1) TDMA/TDMA-GAIT device on an a TDMA call forward or cancel network,

2) TDMA based GAIT device on a GSM call forward or cancel network,

3) GSM/GSM-GAIT device on a GSM call forward or cancel network,

4) GSM based GAIT device on a TDMA call forward or cancel network,

5) TDMA based GAIT SIM inserted into a GSM device and

6) TDMA based GAIT SIM in GSM device served by Lucent® HLR.

The operations of the device according to this invention in each of these scenarios are discussed below.

TDMA/TDMA-GAIT Device on TDMA Network

On the TDMA network, similar to the GSM network, once the destination number has been parsed from the SMS message, the serving HLR 370 of the dialed number must be identified to provide instructions indicating the path to route subsequent calls originally intended for the wireless unit 100. The serving HLR is determined when the call forward server 350 sends an SMS Request via Global Title Translation (GTT) 14 to the STP 380 over the SS7 network 320. As the SMS Request is received at the STP 380, a look-up is performed to confirm the dialed number, the appropriate point code of the HLR serving the dialed number and the address of the serving HLR 370 indicated by the point code. Should the dialed number have a point code found in the STP look-up, the SMS Request is forwarded to the HLR 370, as indicated by the point code. The HLR has now been identified as the HLR serving the dialed number contained in the SMS message. Once the forwarded SMS Request is received at the HLR 370, a return confirmation is sent to the call forward server 350 from the HLR 370, thus confirming the location of the HLR 370. The return confirmation includes the point code of the HLR. The call forward server 350 then creates a feature directive and forwards it to the HLR 370 of the dialed number using the MIN returned in the confirmation from the HLR 370.

TDMA-GAIT Device Operating on GSM Network

In some instances, the initial SMS Request may not confirm the dialed number at the STP 380 (i.e., the SMS Request is rejected by the GSM network). For example, the SMS Request in a TDMA-GAIT device operating on a GSM network will automatically be generated by the call forward server 350 as a TDMA formatted SMS message. In this instance however, the lookup will fail due to the SMS Request formatted in a TDMA format. Thus, the SMS return confirmation at the HLR 370 is never generated or received.

If this is the case, a GSM based Send Routing Info for Short Message (SRIS) is generated, upon failure of the SMS Request, using GTT 10 to the STP 380 from the call forward server 350. Upon confirmation of the SRIS, the address of the HLR serving the GSM based GAIT mobile is now known. Finally, a Register SS for unconditional call forwarding is sent to the HLR using the IMSI and VLR/MSC returned in the confirmation.

If this second request fails, the failure is logged and the SMS message is dropped. Accordingly, the call forward directive is not generated.

GSM Device on GSM Network

On the GSM network, similar to the TDMA network, once the destination number has been parsed from the SMS message, the serving HLR 370 of the dialed number must be identified to provide instructions indicating the path to route subsequent calls originally intended for the wireless unit 100. The serving HLR is determined when the call forward server 350 sends an SRIS via Global Title Translation (GTT) 10 to the STP 380 over the SS7 network 320. As the SRIS is received at the STP 380, a look-up is performed to confirm the dialed number, the appropriate point code of the HLR serving the dialed number and the address of the serving HLR 370 indicated by the point code. Should the dialed number have a point code found in the STP look-up, the SRIS is forwarded to the HLR 370, indicated by the point code.

The HLR 370 has now been identified as the HLR serving the dialed number contained in the SMS message. Once the forwarded SRIS is received at the HLR 370', a return confirmation is sent to the call forward server 350 from the HLR 370, thus confirming the location of the HLR 370. The return confirmation includes the point code of the HLR. The call forward server 350 then creates a Register SS. The Register SS is then sent to the HLR 370 of the dialed number using the IMSI and serving VLR/MSC returned in the confirmation.

GSM-GAIT Device on a TDMA Network

Just as discussed above, the serving HLR 370 of the dialed number must be identified to provide instructions indicating the path to route subsequent calls originally intended for the wireless unit 100. In this example, the GSM-GAIT device will send GSM formatted messages in an attempt to complete the call forward request. Accordingly, the call forward server 350 will first create a GSM type call forward request by send an SRIS via Global Title Translation (GTT) 10 to the STP 380 over the SS7 network 320. As the SRIS is received at the STP 380, a look-up is performed to confirm the dialed number, the appropriate point code of the HLR serving the dialed number and the address of the serving HLR 370 indicated by the point code. However, since in this example, the GSM-GAIT device is operating on a TDMA network, the SRIS will fail. Upon failure of the SRIS message, the call forward server 350 then creates an SMS Request. The SMS request is sent via Global Title Translation (GTT) 14 to the STP 280. As the SMS Request is received at the STP 380, a look-up is performed to confirm the dialed number, appropriate point code of the dialed number and its serving HLR 370. If a return confirmation is received, i.e., if the dialed number is found in the STP listing, a feature request is sent to the HLR 370 of the dialed number using the MIN returned in the confirmation.

TDMA Based GAIT SIM Inserted Into a GSM Device

As known in the art, similar to GSM devices, GAIT devices operate using SIM cards and may be operable on both the TDMA and GSM operating networks. Another feature of the GAIT architecture is that its SIM cards are interchangeable in GAIT and GSM devices. Accordingly, it is possible to have a TDMA based GAIT SIM operating in a GSM device.

Initially, the SMS message received at the call forward server 350 will be treated as a GSM based message. Accordingly, once the destination number has been parsed from the SMS message, the steps needed for identifying the serving HLR of the dialed number are performed to provide instructions indicating the path to reroute of subsequent calls to the wireless unit 100.

The serving HLR is determined when the call forward server 350 sends an SRIS via Global Title Translation (GTT) 10 to the STP 380 over the SS7 network 320. As the SRIS is received at the STP 380, a look-up is performed to confirm the dialed number, the appropriate point code of the HLR serving the dialed number and the address of the serving HLR 370 indicated by the point code. Should the dialed number have a point code found in the STP look-up, the SRIS is forwarded to the serving HLR 370, as indicated by the point code. Once the forwarded SRIS is received at the HLR 370, a return confirmation is sent to the call forward server 350 from the HLR 370, thus confirming the location of the HLR 370 serving the dialed number. However, in this instance, the HLR 370 is a TDMA based HLR. Accordingly, the HLR will return a TDMA based confirmation. As the return confirmation is received at the call forward server 350, the call forward server switches from GSM messaging to TDMA based messaging. Accordingly, a feature request is sent to the HLR 370 to establish the call forward directive.

TDMA Based GAIT SIM Inserted Into a GSM Device on Lucent HLR

Figure 5:
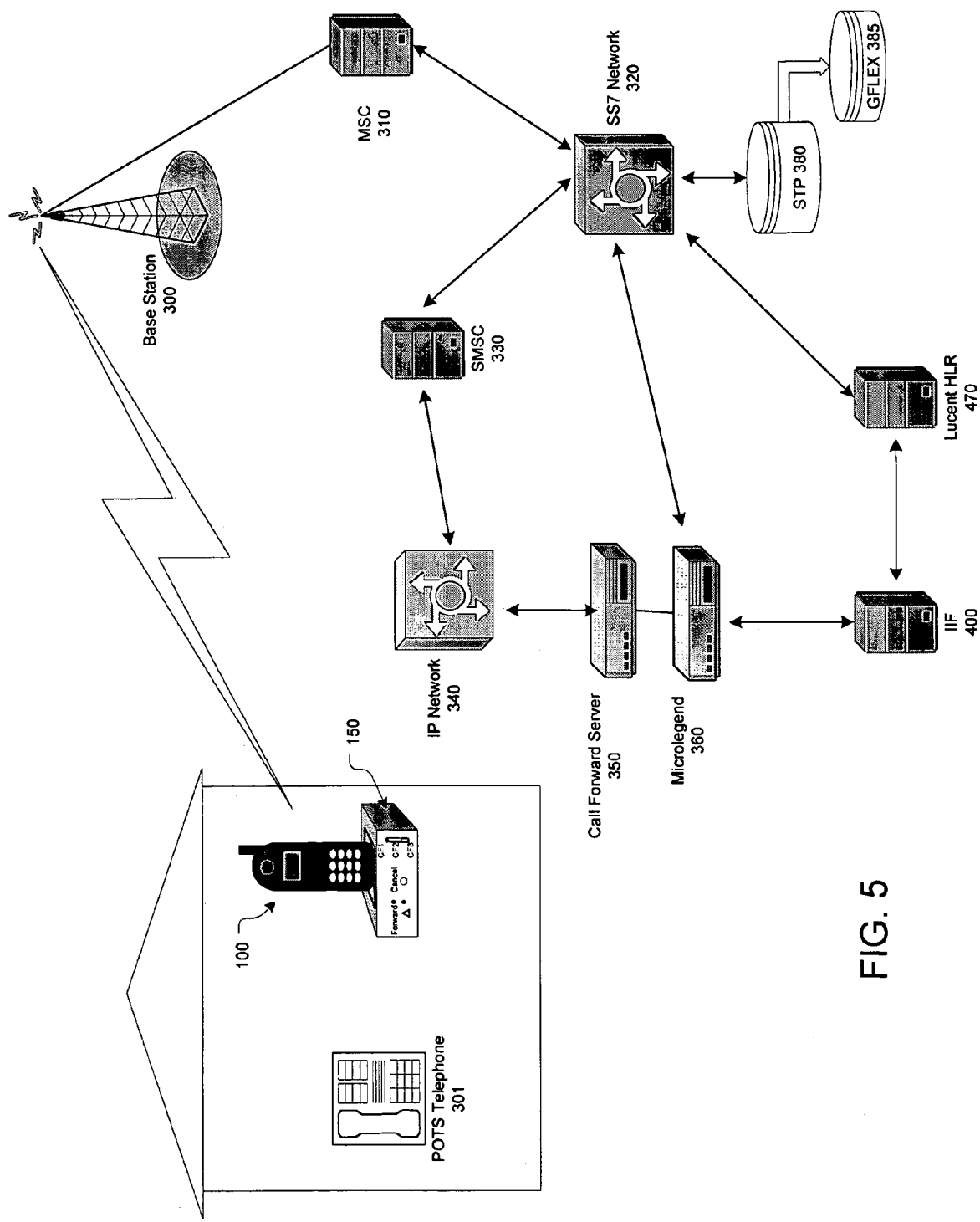
FIG. 5 illustrates a second exemplary call forward network according to this invention.

Referring now to FIG. 5, the operation of the components of the call forward network, in this scenario are substantially the same as described above with the exception of the Interworking Function (IIF) 400 and the Lucent®) HLR 470. As known in the art, the Lucent®) HLR contains an integrated MSC, which in turn causes the HLR to operate in a manner that is not conventional to other HLR types when a call forward request is initiated by a GSM device containing a TDMA based GAIT SIM.

In operation, similar to other GSM based devices, when the SMS message is received at the call forward server 350, the SMS message is treated as a GSM type call forward request. Accordingly, the call forward server sends an SRIS via Global Title Translation (GTT) 10 to the STP 380. The STP 380 performs the appropriate lookup. Once the lookup has been performed, the SRIS is forwarded to the Lucent® HLR 470. In return, the Lucent® HLR returns the point code of the IIF 400 to the call forward server 350. In response, the call forward server 350 forwards a Register SS to the IIF 400. Upon receipt of the Register SS, the IIF converts the Register SS into a SMS feature directive using the provisioned ESN stored in the IIF 400. Accordingly a call forward directive has been established for the device.

It should be appreciated that the principles of operation and other inventive aspects of the embodiments of the base units 150 and 155 discussed herein can be implemented within the environment of any now known or later developed operating system having messaging capabilities, such as CDMA, without departing from the scope of this invention. In some instances, one skilled in the art would readily recognize the slight variations may be needed to adapt the format or flow of the call forwarding instructions to the protocols of the operating system.

Figure 6A:
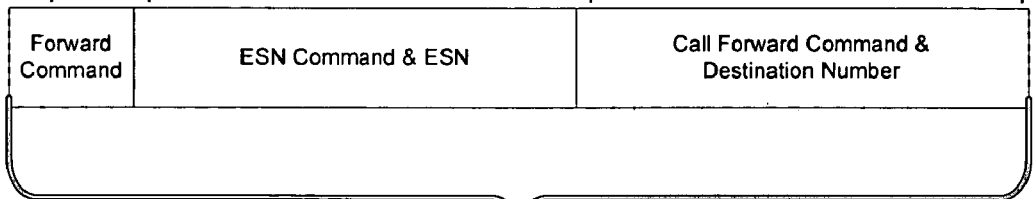
FIGS. 6A and 6B illustrate exemplary SMS call forward messages usable in the TDMA and GSM operating networks, according to this invention.
Figure 6B:
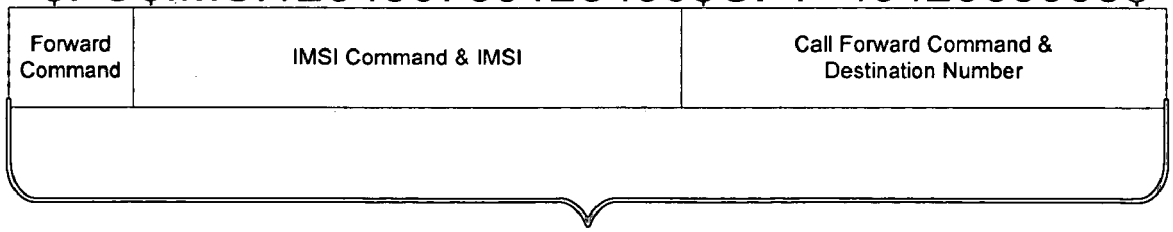

An example of an SMS message generated by the wireless unit 100 is shown in FIGS. 6A and 6B. FIG. 6A illustrates an SMS message that may be generated by a TDMA device in accordance with the embodiments of this invention. FIG. 6B illustrates an SMS message that may be generated by a GSM device.

As shown in FIG. 6A, the TDMA operating system identifies the wireless unit using the ESN. In contrast, the GSM operating system identifies the wireless unit using the IMSI. When the call forward server 350 receives either message type, as discussed above, the call forward server parses the information in the SMS message to issue the appropriate call forward command.

Figure 7:
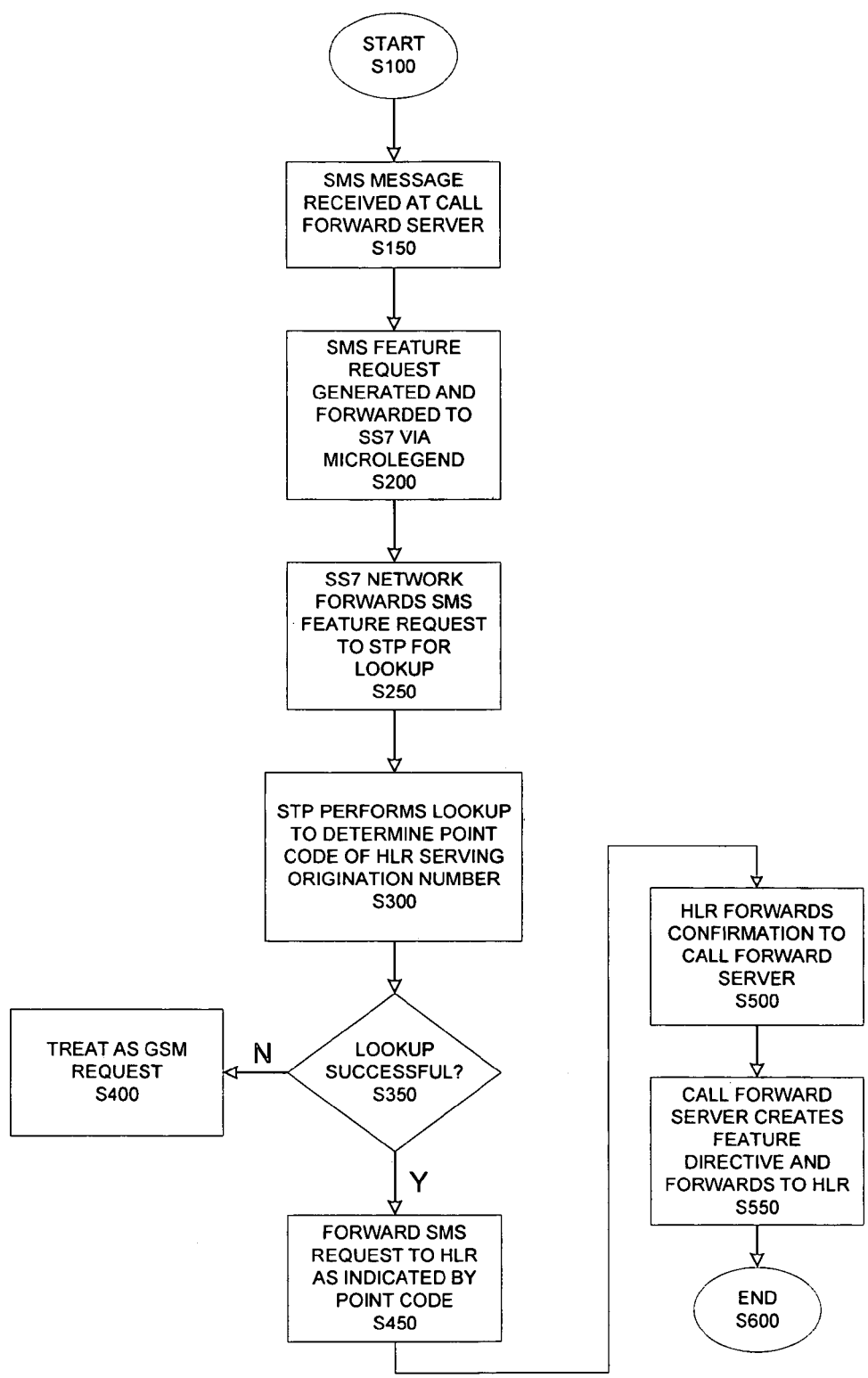
FIG. 7 is a flowchart illustrating exemplary methods for providing call forward instructions in a TDMA call forward network.

FIG. 7 illustrates an exemplary method for initiating a call forward request in a pure TDMA or TDMA-GAIT device used on a TDMA or GSM call forward or cancel network according to this invention.

In step S100, the control routine begins. The control routine then proceeds to step S150.

In steps S150 and S200, an SMS message is received at a call forward server in accordance with the systems and methods described herein. Next, the call forward server decodes the SMS message to generate the appropriate action, for example, the call forward server may generate a call forward feature request. The call forward feature request is then forwarded by the call forward server to the SS7 network, via the Microlegend. In route of the call forward request to the SS7 network, the Microlegend provides protocol conversions between the TCP/IP based network elements and the SS7 network. The control routine then proceeds to step S250.

In steps S250 and S300, the SS7 network forwards the SMS Request to the STP where a look-up is performed to confirm the dialed number, the appropriate point code of the HLR serving the dialed number and the address of the serving HLR 370 indicated by the point code. The control routine then proceeds to step S350.

At step S350, a decision is made to determine if the look-up of the point code was successful. If the lookup was successful, the control proceeds to step S450; otherwise, the control proceeds to step S400.

At step S400, the SMS message is treated as originating from a GSM device. The operation of the GSM control method is described with respect to FIG. 8.

At step S450, the STP forwards the SMS message to the HLR indicated by the point code found in lookup at step S350. Control the proceeds to step S500.

At step S500, HLR serving the destination number has now been identified. Once the forwarded SMS Request is received at the HLR, a return confirmation is sent from the HLR to the call forward server. Now, the location of the HLR has been confirmed. The return confirmation includes the point code of the HLR. The control then proceeds to step S550.

At step S550, upon receipt of the confirmation, the call forward server creates a feature directive and forwards it to the HLR of the dialed number using the MIN returned in the confirmation from the HLR. The control routine proceeds to step S600.

In step S600, the control routine ends.

Figure 8:
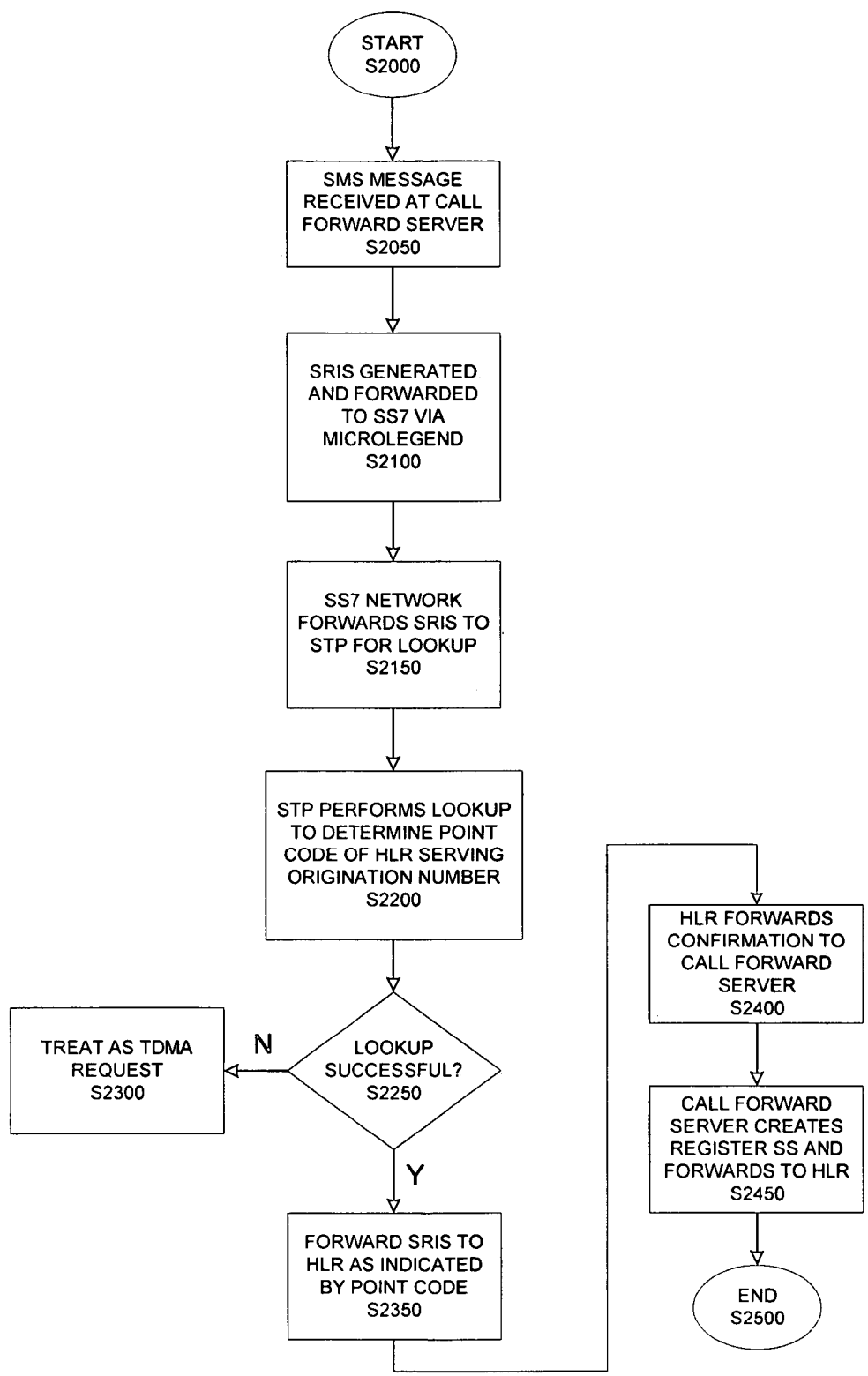
FIG. 8 is a flowchart illustrating exemplary methods for providing call forward instructions in a GSM call forward network.

FIG. 8 illustrates an exemplary method for initiating a call forward request in a pure GSM or GSM-GAIT device used on a GSM or TDMA call forward or cancel network according to this invention.

In step S2000, the control routine begins. The control routine then proceeds to step S2050.

In steps S2050 and S2100, an SMS message is received at a call forward server in accordance with the systems and methods described herein. Next, the call forward server decodes the SMS message to generate the appropriate action, for example, the call forward server may generate a SRIS. The SRIS is then forwarded by the call forward server to the SS7 network, via the Microlegend. In route of the SRIS to the SS7 network, the Microlegend provides protocol conversions between the TCP/IP based network elements and the SS7 network. The control routine then proceeds to step S2150.

In steps S2150 and S2200, the SS7 network forwards the SRIS to the STP where a look-up is performed to confirm the dialed number, the appropriate point code of the HLR serving the dialed number and the address of the serving HLR indicated by the point code. The control routine then proceeds to step S2250.

At step S2250, a decision is made to determine if the look-up of the point code was successful. If the lookup was successful, the control proceeds to step S2350; otherwise, the control proceeds to step S2300.

At step S2300, the SMS message is treated as originating from a TDMA device. The operation of the TDMA control method is described with respect to FIG. 7.

At step S2350, the STP forwards the SRIS to the HLR indicated by the point code found in lookup at step S2250. Control the proceeds to step S2400.

At step S2400, HLR serving the destination number has now been identified. Once the forwarded SRIS is received at the HLR, a return confirmation is sent from the HLR to the call forward server. Now, the location of the HLR has been confirmed. The return confirmation includes the point code of the HLR. The control then proceeds to step S2450.

At step S2450, upon receipt of the confirmation, the call forward server creates a Register SS and forwards it to the HLR of the dialed number returned in the confirmation. The control routine proceeds to step S2500.

In step S2500, the control routine ends.

Figure 9:
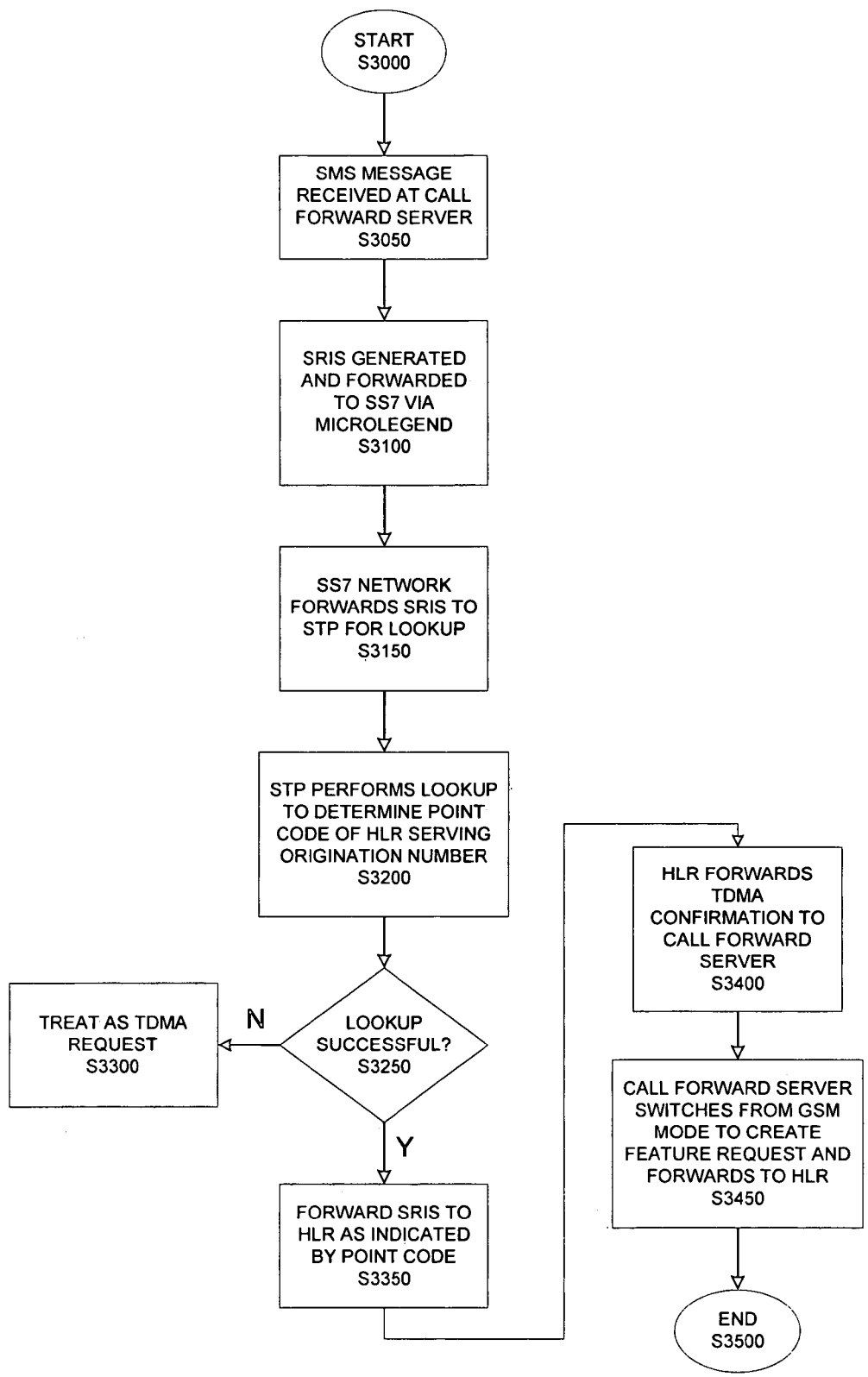
FIG. 9 is a flowchart illustrating exemplary methods for providing call forwarding in a GSM device containing a GAIT SIM.

FIG. 9 illustrates an exemplary method for initiating a call forward request in a GSM device containing a TDMA-GAIT SIM according to this invention.

In step S3000, the control routine begins. The control routine then proceeds to step S3050.

In steps S3050 and S3100, an SMS message is received at a call forward server in accordance with the systems and methods described herein. Next, the call forward server decodes the SMS message to generate the appropriate action, for example, the call forward server may generate a SRIS. The SRIS is then forwarded by the call forward server to the SS7 network, via the Microlegend. In route of the SRIS to the SS7 network, the Microlegend provides protocol conversions between the TCP/IP based network elements and the SS7 network. The control routine then proceeds to step S3150.

In steps S3150 and S3200, the SS7 network forwards the SRIS to the STP where a look-up is performed to confirm the dialed number, the appropriate point code of the HLR serving the dialed number and the address of the serving HLR indicated by the point code. The control routine then proceeds to step S3250.

At step S3250, a decision is made to determine if the look-up of the point code was successful. If the lookup was successful, the control proceeds to step S3350; otherwise, the control proceeds to step S3300.

At step S3300, the SMS message is treated as originating from a TDMA device. The operation of the TDMA control method is described with respect to FIG. 7.

At step S3350, the STP forwards the SRIS to the HLR indicated by the point code found in lookup at step S3250. Control the proceeds to step S3400.

At step S3400, HLR serving the destination number has now been identified. Once the forwarded SRIS is received at the HLR, a TDMA based return confirmation is sent from the HLR to the call forward server, because the HLR is TDMA based. Now, the location of the HLR has been confirmed. The return confirmation includes the point code of the HLR. The control then proceeds to step S3450.

At step S3450, upon receipt of the confirmation, the call forward server switched modes from GSM messaging to create a TDMA feature request and forwards it to the HLR returned in the confirmation. The control routine proceeds to step S3500.

Figure 10:
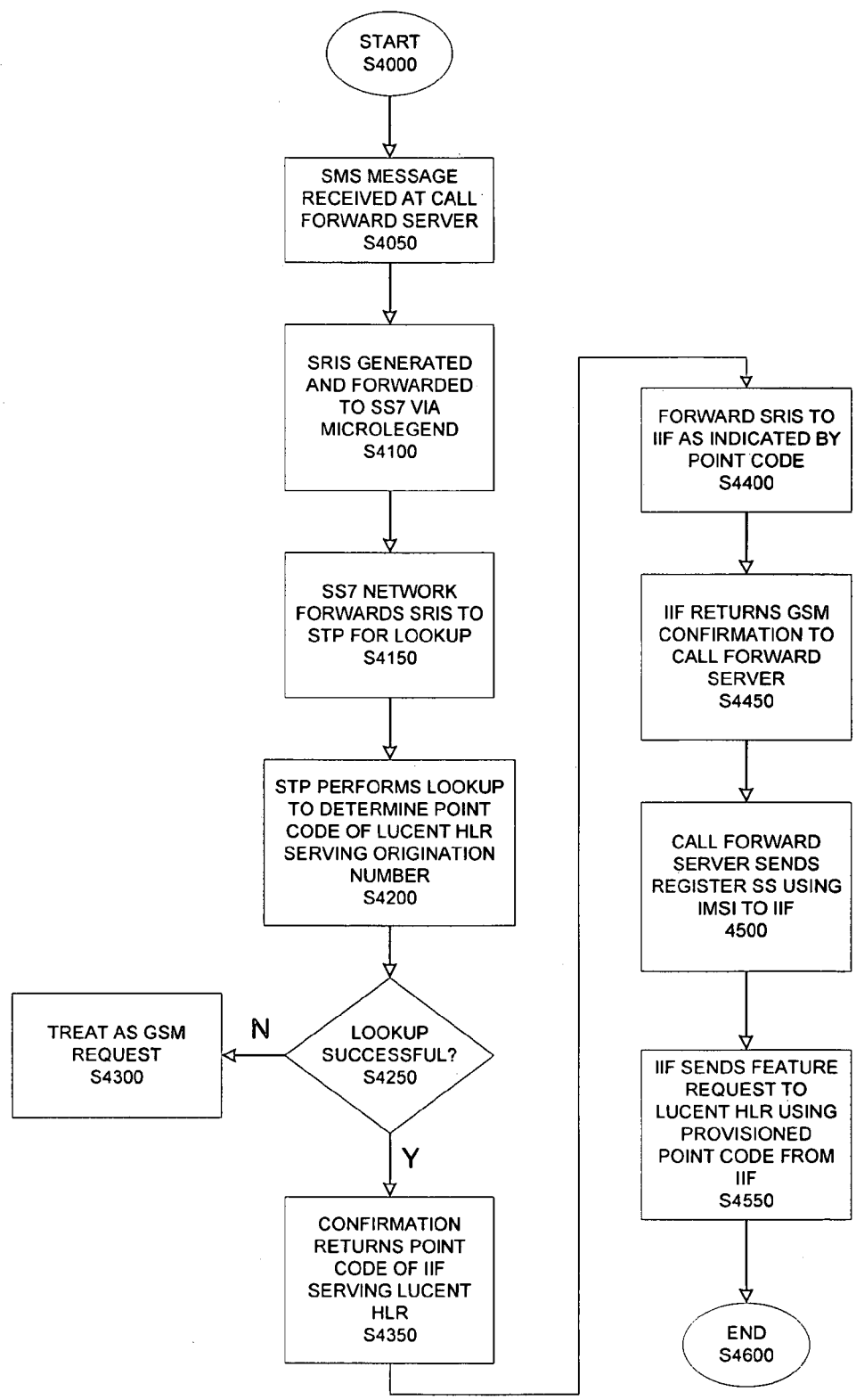
FIG. 10 is a flowchart illustrating exemplary methods for providing call forwarding in a GSM device containing a GAIT SIM that is served by a Lucent HLR.

FIG. 10 illustrates an exemplary method for initiating a call forward request in a GSM device containing a TDMA-GAIT SIM served by a Lucent HLR according to this invention.

In step S4000, the control routine begins. The control routine then proceeds to step S3050.

In steps S4050 and S4100, an SMS message is received at a call forward server in accordance with the systems and methods described herein. Next, the call forward server decodes the SMS message to generate the appropriate action, for example, the call forward server may generate a SRIS. The SRIS is then forwarded by the call forward server to the SS7 network, via the Microlegend. In route of the SRIS to the SS7 network, the Microlegend provides protocol conversions between the TCP/IP based network elements and the SS7 network. The control routine then proceeds to step S4150.

In steps S4150 and S4200, the SS7 network forwards the SRIS to the STP where a look-up is performed to confirm the dialed number, the appropriate point code of the Lucent HLR serving the dialed number and the address of the serving Lucent HLR indicated by the point code. The control routine then proceeds to step S4250.

At step S4250, a decision is made to determine if the look-up of the point code was successful. If the lookup was successful, the control proceeds to step S4350; otherwise, the control proceeds to step S4300.

At step S4300, the SMS message is treated as originating from a TDMA device. The operation of the TDMA control method is described with respect to FIG. 7.

At step S4350, the STP forwards the SRIS to the Lucent HLR indicated by the point code found in lookup at step S4250. Accordingly, Lucent HLR serving the destination number has now been identified. Once the forwarded SRIS is received at the Lucent HLR, a TDMA based return confirmation including the point code of the Lucent HLR is sent from the Lucent HLR to the call forward server. Now, the location of the Lucent HLR has been confirmed. The return confirmation includes the point code of the IIF. The control then proceeds to step S4400.

At step S4400, upon receipt of the confirmation, the call forward server creates a Register SS and forwards it to the IIF using the IMSI received in confirmation. The control routine proceeds to step S4450.

In steps 4450 and 4500, the IIF returns a GSM confirmation to call forward server. The call forward serve then generates a Register SS and forwards it to the IIF using the IMSI. The control routine then proceeds to step 4600.

At step 4600, upon receipt of the Register SS at the IIF, the IIF converts the Register SS into a SMS feature directive using the provisioned ESN stored in the IIF 400. The control routine then ends at step 4600.

One of ordinary skill in the art would understand that the steps described above in FIGS. 7–10 are not limited to any one particular order and may be implemented in any order that may achieve the objects and features described above in accordance with the systems and methods of this invention.

It is also to be understood that a carrier wave may be encoded to transmit a control program for use that includes the processes described above for the centralized notification system to a device for executing the control program.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A method of forwarding a call directed to a wireless device operational on a wireless network to a destination number comprising:

detecting the presence of the wireless device by a base unit, the base unit including a destination number selection switch having at least two settings;

determining the destination number to which the call will be forwarded;

creating a data message comprising a call forward instruction;

causing a communication between the wireless device and the wireless network wherein the data message is communicated to the wireless network;

receiving the data message at an SMSC of the wireless network;

determining at the SMSC if the data message comprises a call forward request; and forwarding the data message to a call forward server if the data message comprises a call forward request, the determining step being performed by the base unit scanning a memory location in the wireless device to retrieve the destination number based on the destination number selection switch setting.

2. The method of claim 1 further comprising:

receiving the data message at the call forward server;

generating a call forward feature request at the call forward server based on the data message; and sending the call forward feature request to an SS7 network.

3. A forwarding device for forwarding dialed calls intended for a wireless device in a wireless network to a destination number comprising:

a cradle for holding the wireless device;

a contact for engaging the wireless device; and a destination number selection switch, the forwarding device being configured to instruct the wireless device, via the contact, to create and transmit a data message to the wireless network, the data message including the destination number and instructions to forward calls for the wireless device to the destination number, the destination number selection switch including settings for directing which of a plurality of number stored in the wireless device is to be used as the destination number for the data message, the forwarding device being configured to instruct the wireless device to perform a scan of a wireless device memory for content corresponding to the setting of the destination number selection switch, the scan being a text scan of the wireless device memory for a string associated with the setting of the destination number selection switch, the content being a destination number stored in a record of the wireless device memory along with the string.

4. The device of claim 3 wherein the data message is an SMS message transmitted to an SMSC of the wireless network.

5. A wireless device for use in a wireless network, the wireless device comprising:

a processor;

a memory comprising program instructions; and a contact for engaging a forwarding device, the program instructions making the processor operable to:

receive a communication from the forwarding device via the contact, the communication including a setting of a destination number selection switch of the forwarding device;

create a data message in response to the received communication;

transmit the data message to the wireless network in response to the received communication, the data message including a destination number and instructions to forward calls for the wireless device to the destination number;

scan a phonebook memory of the wireless device to determine the destination number in response to the communication received from the forwarding device; and scan the phonebook memory for an entry that corresponds to the setting and to use a telephone number associated with the entry as the destination number.

6. The device of claim 5 wherein, the processor is further operable to scan the phonebook memory for a default destination number if no entry corresponding to the setting is found.

7. The device of claim 5 wherein the data message is an SMS message transmitted to an SMSC of the wireless network.

* * * * *